Dec. 25, 1945.　　　　P. C. TRACY　　　　2,391,527

MOLDING MACHINE

Filed Feb. 11, 1943　　　　4 Sheets-Sheet 1

Inventor
P. C. Tracy
By Rule and Hoge
Attorneys

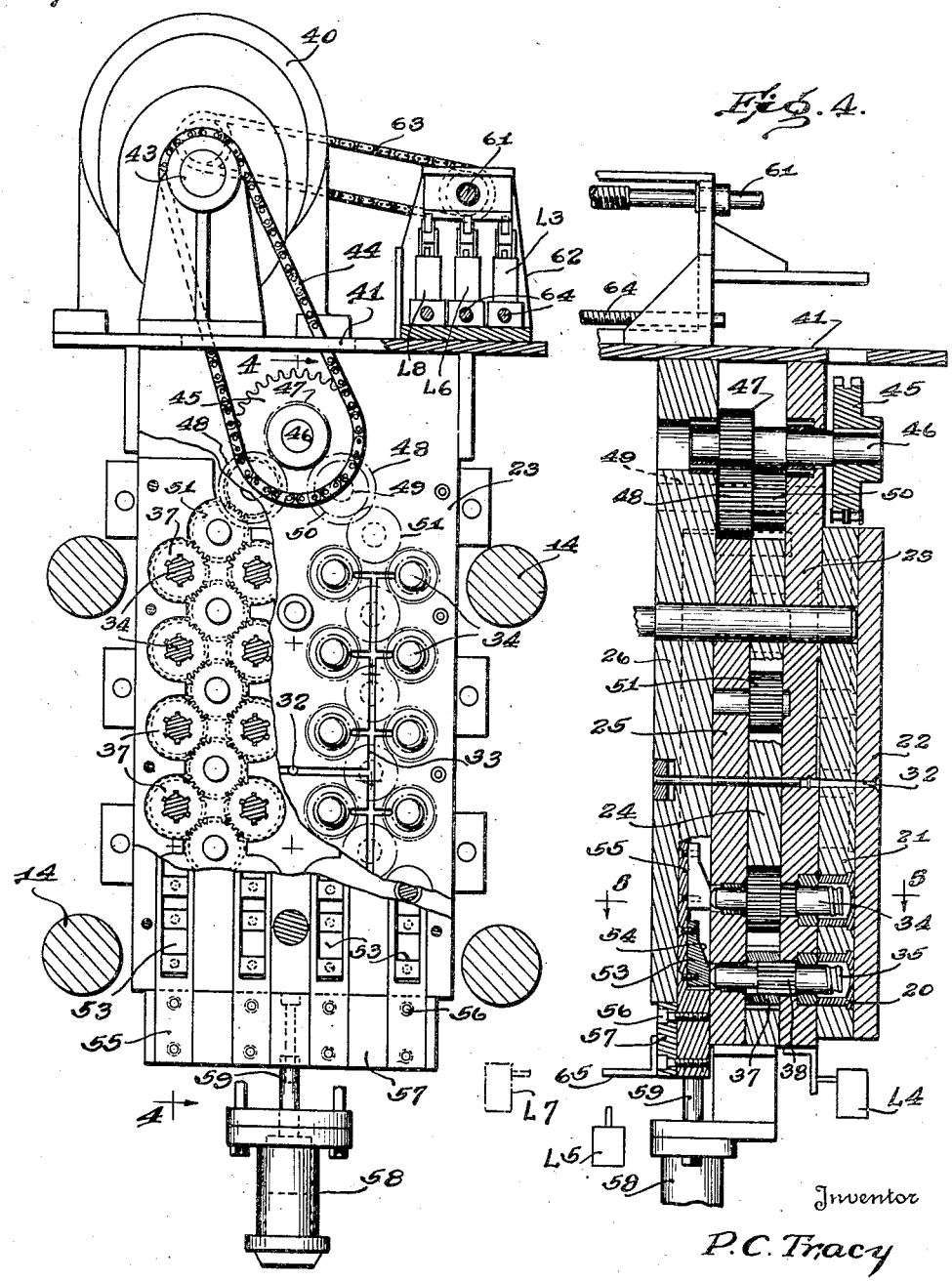

Inventor
P. C. Tracy
By Rule & Hoge
Attorneys

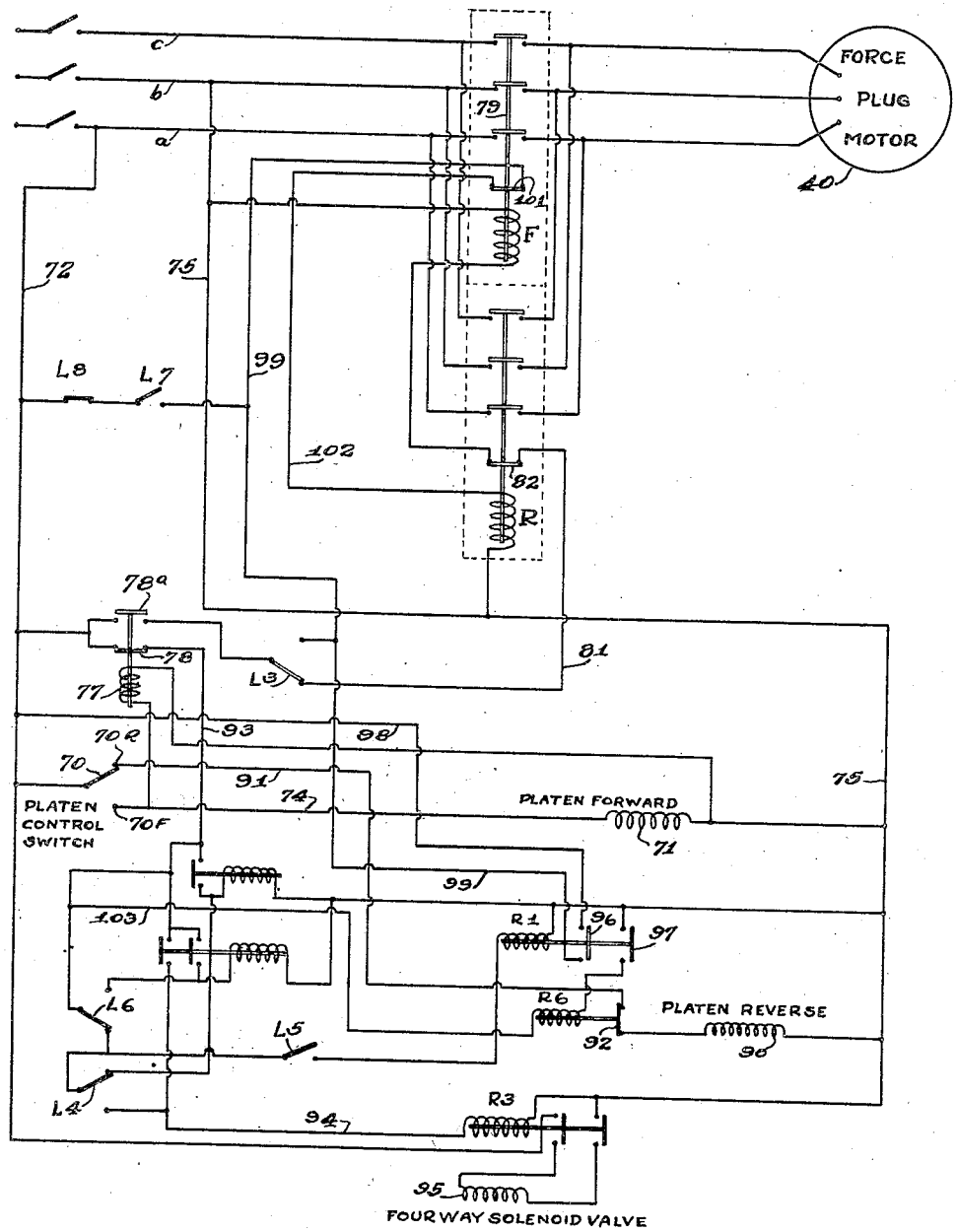

Patented Dec. 25, 1945

2,391,527

UNITED STATES PATENT OFFICE 2,391,527

MOLDING MACHINE

Parker C. Tracy, Toledo, Ohio, assignor to Owens-Illinois Glass Company, a corporation of Ohio Application February 11, 1943, Serial No. 475,470

14 Claims. (Cl. 18—16)

My invention relates to machines for molding articles formed with screw threads, including closure caps and various other threaded articles. These may be made of various materials, including organic plastics of both the thermoplastic and the thermosetting type.

An object of the invention is to provide a multiple type machine, which is simple and reliable in operation, adapted for molding a considerable number of articles simultaneously.

In Patent No. 2,326,382, Motor control, granted August 10, 1943, to Moreland and Tracy, there is disclosed a machine of the type above indicated for making internally threaded closure caps and the like. In said machine the screw-threaded molding plugs, for molding the threaded interior surfaces of the articles, are spirally advanced into molding position by an electric motor operating through suitable driving mechanism and are held in molding position by the motor while the latter is stationary under a reduced torque. After the molded articles have set or hardened, the motor is reversed to withdraw the screw-threaded molding plugs.

The present invention embodies certain improvements over the disclosure in said patent, an object of my invention being to provide means for holding the molding plugs in operative position independently of the motor.

A further object of my invention is to provide a molding machine of the type indicated in which the molding plug or element with its spiral molding surface, may be withdrawn from the molded article by rotating said element about its axis while the molded article is held against rotation, and in which said rotative element is guided and its lengthwise movement during said withdrawal is controlled solely by the spiral surface of the molded article. The invention provides a construction in which the molding plugs may be brought to molding position by a non-rotative, straight-line forward movement, and withdrawn from the molded article by rotating the plugs while the molded articles guide them in a spiral path to a retracted position.

A further object of the invention is to provide a molding machine comprising cooperating molding elements, one of which is provided with a spiral or screw-threaded molding surface, and providing automatic means by which the mold sections are slightly separated after the molded article has set, to relieve the pressure, and the threaded molding element thereafter withdrawn by a spiral movement.

A further object of the invention is to provide an injection molding machine for molding internally threaded articles, comprising separable plates or supports in one of which are mounted molding plugs with spiral molding surfaces, and in the other of which are mounted the cooperating mold sections, and means for separating said plates after the molding operation, leaving the molded articles supported on the molding plugs, and means for thereafter removing the molded articles by rotation of the plugs.

Other objects of the invention will appear hereinafter.

Referring to the accompanying drawings which illustrate a machine embodying the present invention:

Fig. 3 is a cross sectional elevation of the machine with parts broken away.

Fig. 4 is a section at the line 4—4 on Fig. 3.

Fig. 10 is a wiring diagram of the electrical equipment.

Figure 1:
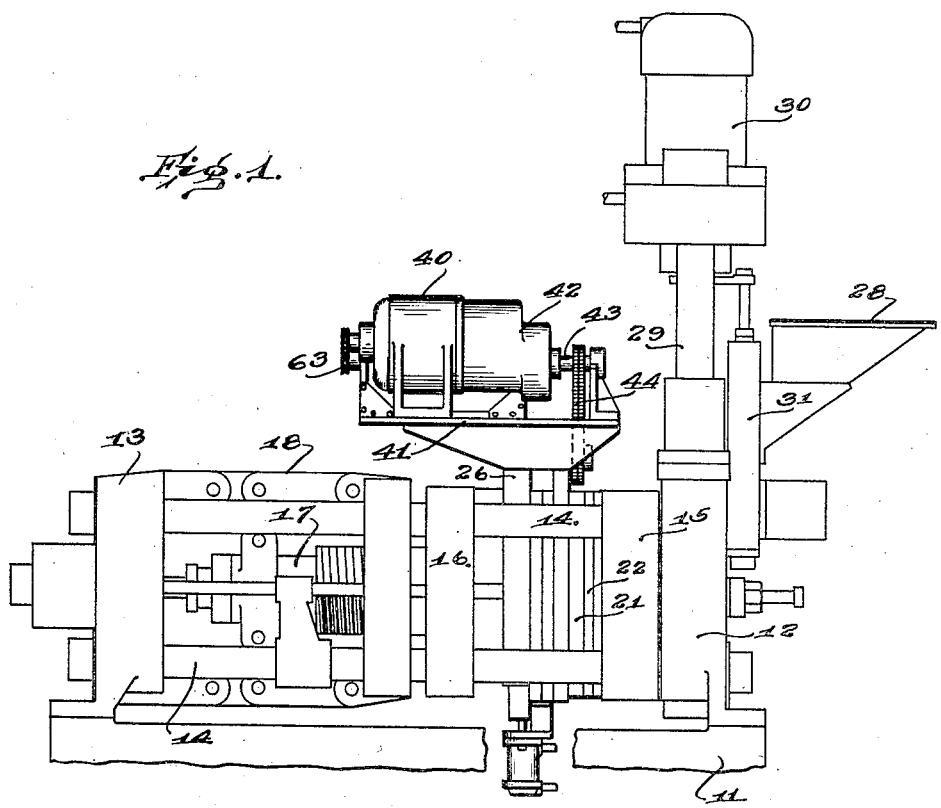
Fig. 1 is a partly diagrammatic elevation of the machine.

The invention as illustrated in the drawings is embodied in a machine which, except as to parts shown in detail in Figs. 3 to 9 inclusive, is mainly of prior art construction as disclosed for example in the patent to Moreland et al. No. 2,298,716, October 13, 1942, Machine for molding thermoplastics.

Figure 2:
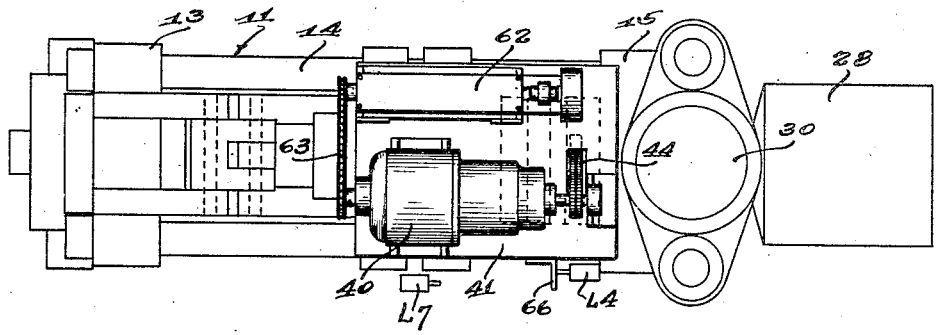
Fig. 2 is a plan view of the same.

Referring to Figs. 1 and 2, the machine frame 11 includes vertical end members 12 and 13 and horizontal tie bars 14. A stationary bolster plate 15 has a fixed mounting on the bars 14. A bolster plate 16 slidably mounted on said bars, is connected to and forms a part of a reciprocating carriage by which the complementary sections of the dies or molds are moved to and from each other. The carriage is reciprocated by a hydraulic motor 17 having operating connections therewith through mechanism including toggles 18. The hollow molds or dies 20 (Fig. 4) are mounted in a die plate 21 to which is attached a backing plate 22, the plate 22 in turn being secured to the stationary bolster plate 15. The carriage includes a plurality of vertically disposed, juxtaposed plates 23, 24, 25, and 26. The plate 23, which serves as a movable platen or die plate, has mounted therein bushings 27 or die sections complemental to the dies 20.

Means for supplying molding material to the dies includes a hopper 28 (Figs. 1 and 2) in which the material in powdered or granular form is placed. The member 12 provides a heating chamber through which the material passes on its way to the molds and in which it is heated and rendered soft or plastic. An injection plunger 29 is periodically reciprocated vertically by an electric motor 30 and forces the plastic molding material through an injection nozzle and passageways to the mold cavities. The molding material is admitted in measured quantities from the hopper 28 to the heating chamber under the control of a feeder device 31 including a reciprocating feeder plug operatively connected to the motor 30.

Referring to Figs. 3 and 4, the passageways through which the molding material is forced into the mold cavities include a sprue opening 32 extending through the plates 22 and 21 and communicating with branch sprues or passageways 33 formed in the face of the plate 23 and opening into the mold cavities. Associated with each of the molds or dies is a screw plug 34 comprising a head 34a (Fig. 5) and body 34b having a screw-threaded connection. The head 34a is formed on its forward end with a screw thread 35 for molding the thread on the inner face of the molded article 36, herein referred to as a screw cap. The plugs 34, hereinafter referred to as force plugs, are mounted for movement in the direction of their length and also for rotation about their axes, thus permitting them to be withdrawn from the molded caps. Rotary motion is transmitted to the plugs through spur gears 37 individual thereto, said gears being positioned in openings provided in the plate 24 and backed by the plates 23 and 25 which hold the gears against movement in an axial direction. Each force plug 34 is formed with longitudinal ribs or teeth 38 to provide a driving connection with the said gears.

Means for rotating the force plugs includes an electric motor 40 mounted on a platform 41 which in turn is mounted on the carriage. Driving connections between the motor and plugs include a train of gearing within a gear case 42 for driving a shaft 43. The latter drives a sprocket chain 44 trained over a sprocket gear 45 keyed to a shaft 46 journalled in the plates 23, 26. Keyed to the shaft 46 is a pinion 47 which meshes with a pair of spur gears 48 keyed to shafts 49 journalled in the plates 23 and 26. Also keyed to the shafts 49 are gears 50 each included in a gear train comprising gears 51 running in mesh with the gears 37. It will be noted that, as clearly shown in Fig. 3, the gears are so arranged that all of the gears 37 with their plugs 34 are rotated simultaneously in the same direction. The motor 40 is periodically reversed for rotating the plugs alternately in oppositely directions as hereinafter set forth.

The molding plugs 34 are held in their forward or molding position during the injection of the molding material and while the material is cooling and setting, by means of cam blocks 53 in the form of wedges, each having an inclined cam face 54. These blocks are carried on vertical strips 55 (Figs. 3 and 4) which are attached by screws 56 to a crossbar 57. An air operated piston motor 58 has its plunger 59 connected to the crossbar 57 and is operative for simultaneously moving all of the cam blocks up and down. When the cam blocks 53 are moved upwardly, they force the molding plugs 34 forward to their operative position shown in Figs. 4 and 5 and then serve as a positive means for holding the plugs in such position during the molding operation.

Figure 5:
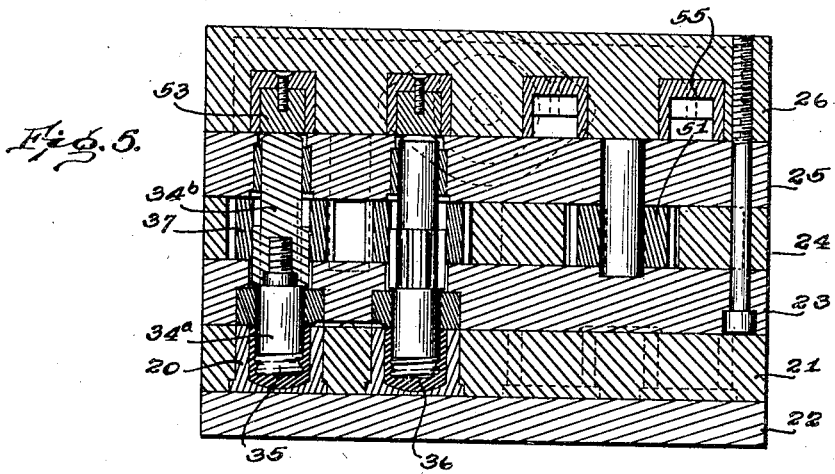
Fig. 5 is a section at the line 5—5 on Fig. 4.
Figures 6, 7:
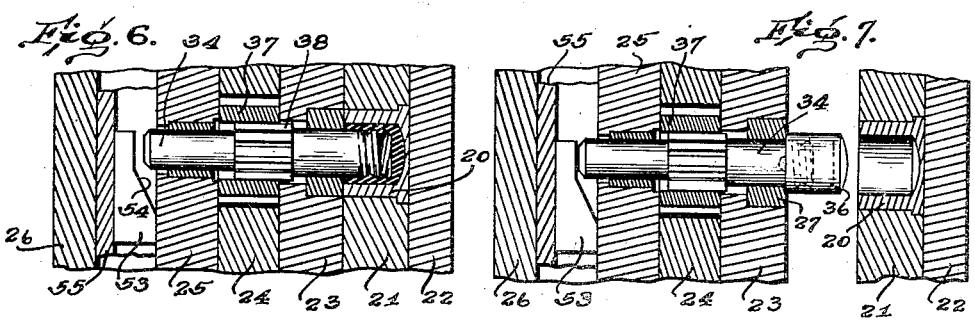
Fig. 6 is a fragmentary sectional elevation showing a mold with the molded article therein and the screw plug partially retracted.
Fig. 7 is a similar view showing the movable platen withdrawn.
Figure 8:
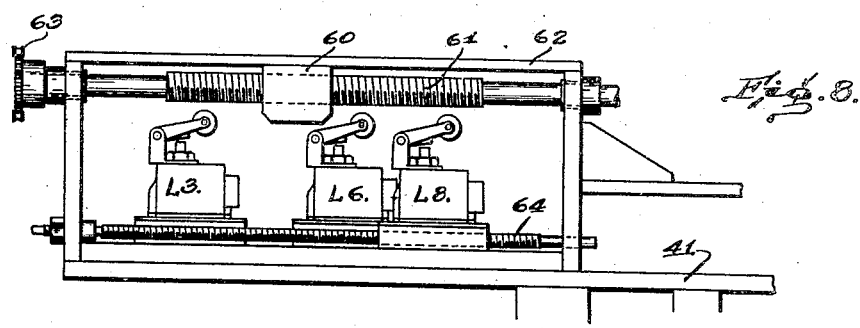
Fig. 8 is an elevational view of a series of limit switches and their mountings and the switch operating means.
Figure 9:
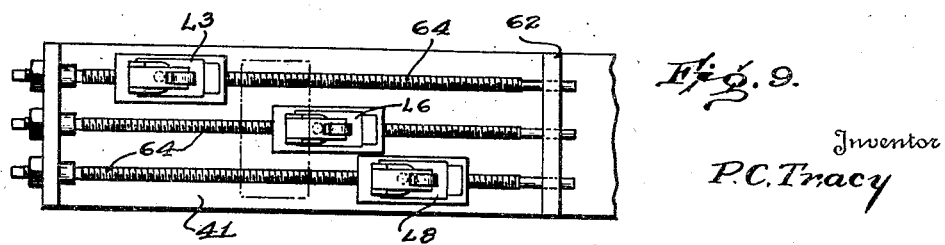
Fig. 9 is a plan view of said switches.

After the set of caps has been formed in the molds and the material cooled and hardened, the cam blocks 53 are lowered as shown in Figs. 6 and 7. This permits the plugs to be rotated for partially unscrewing or withdrawing them from the molded caps 36, bringing the plugs to the Fig. 6 position while the die plates 21, 23 are still together (Figs. 5 and 6). The carriage or movable platen is then withdrawn (Fig. 7) and the backward rotation of the plugs is continued to complete the unscrewing or withdrawal from the molded caps. It will be noted that the caps are held against rotation as they are all connected by the sprue which forms in the sprue channel 33 (Fig. 3).

The operation of the machine is under the automatic control of electro-responsive mechanism including micro-switches which function as limit switches. These include among others, three limit switches (Figs. 8 and 9) designated L3, L6 and L8 which are actuated by a contact block 60 having a screw-threaded connection with a screw shaft 61 journalled in a frame 62 mounted on the platform 41. The shaft 61 is driven from the motor 40 through a sprocket chain 63 trained over sprocket wheels on the motor shaft and the shaft 61. These three limit switches are slidably mounted for individual adjustment lengthwise of the frame 62, by means of screw rods 64.

A limit switch L4 (Fig. 4) is mounted behind the platen 23 and is operated when the platen is "cracked" open, as hereinafter set forth. A limit switch L5 (Fig. 4) is mounted and arranged to be closed by a contact arm 65 on the crossbar 57 as the latter completes its downward movement by which the wedges 53 are withdrawn. A limit switch L7 (Fig. 2) is actuated by a contact arm 66 on the mold carriage as the latter nears the limit of its mold opening movement.

The several steps in the operation of the machine take place in the following order. Assuming the mold carriage to be withdrawn and the force plugs 34 in their retracted position, the hydraulic motor which actuates the carriage, is started and moves the carriage forward and thereby closes the molds. The force plugs are at the same time rotated by the motor 40 and brought to their forward or molding positions within the dies 20. The molding material is then injected into the molds and allowed to set and harden. The die plates are then "cracked" as a preliminary to the unscrewing or retraction of the force plugs.

This cracking consists in withdrawing the carriage a slight distance, sufficient to relieve the pressure of the wedges 55 against the plugs before the backward rotation of the plugs commences. As the caps are molded under a very high pressure, any attempt to rotate the plugs before such cracking operation might place an undue strain on the molded caps causing twisting or breakage. It would also tend to sever the caps from the sprue and thus interfere with their final removal from the plugs. It will be noted that the sprue links the caps together and permits the entire group to be removed from the machine as a unit.

Immediately after the cracking operation takes place, the piston motor 58 operates to lower the wedges 55. As this movement is completed, the motor 40 is started and rotates the plugs 34 backward to an intermediate position (Fig. 6) in which they are partly unscrewed from the mold caps. The motor 40 is then stopped and at the same time the hydraulic motor is started and separates the die plates so that the plugs 34 withdraw the molded caps from the molds 20. As this movement is about completed, the motor 40 is again started and rotated backward to complete the withdrawal of the plugs 34 from the molded caps. The motor 40 is then automatically stopped, thereby completing the cycle.

Referring to the electrical diagram (Fig. 10), the force plug motor 40 is connected in a three-phase system comprising main line wires $a$, $b$, $c$, which system also supplies current for the various electrical controls. To start the platen forward for closing the molds, a platen control switch 70 which may be operated by hand, is actuated and establishes a circuit for a valve solenoid 71 and thereby opens a valve for the hydraulic motor 17 which then operates to move the platen forward. This circuit may be traced from the line wire $a$, through conductor 72, switch 70, its contact 70F, wire 74, "platen forward" relay 71, wire 75, to line wire $b$.

The above operation of switch 70 at the same closes a circuit through a control relay coil 77 connected in parallel with the coil 71. The coil 77 being thus energized, moves the relay contact 78 to open position and closes contact 78$^a$ to thereby complete a circuit for the "forward" solenoid F of a circuit closer 79. This circuit extends from line wire $a$ through wire 72, contact bar 78$^a$, limit switch L3, wire 81, contact bar 82, coil F, to line wire $b$. Solenoid F being energized, closes switch 79 so that the motor 40 is started and runs in a forward direction concurrently with the forward movement of the platen. The force plugs are thus rotated in a forward direction and brought to molding position within the dies 20.

As the plugs complete their forward movement, the contact block 60 (Fig. 8) operates the limit switch L3 and thereby opens the circuit through the coil F which effects an opening of the motor switch 79 and stops the motor. The injection of molding material into the molds, molding and cooling or setting of the molded caps, now takes place.

Following this, the platen control switch 70 is reversed, either by hand or under the control of an automatic timer (not shown). This makes a circuit for a "platen reverse" solenoid 90, which circuit extends from main $a$ through wire 72, switch 70, contact 70R, wire 91, contact bar 92 and platen reverse solenoid 90. The solenoid 90 now operates a valve for the hydraulic motor 17 and starts it in the reverse direction for "cracking" the molds.

As soon as the platen has been withdrawn a slight distance, it operates the limit switch L4 (Figs. 4 and 10). This completes a circuit through a control relay R3. This circuit may be traced from main $a$ through wire 72, contact bar 78, wire 93, limit switches L6 and L4, wire 94, relay R3, and wire 75 to main $b$. The relay R3 being thus energized, operates to make a circuit for a solenoid 95 which then operates a four-way solenoid valve which controls the piston motor 58. The latter therefore operates to withdraw the cam blocks 55.

As the motor piston completes its downward movement (Fig. 4) the contact arm 65 operates the limit switch L5, moving it to closed position (Fig. 10). This completes a circuit for a control relay R1, which circuit may be followed from main $a$ through wire 72, contact bar 78, wire 93, limit switches L6 and L5, relay R1 and wire 75 to main $b$. The solenoid R1 being energized, moves its contacts 96 and 97 to closed position. Contact 97 closes a circuit for a relay R6 and causes it to open the contact 92 in circuit with the solenoid 90 so that the platen motor is stopped. The contact 96 completes a circuit through the coil R controlling the reverse or backward movement of the motor 40 by which the force plugs are unscrewed. This circuit may be traced from main $a$ through wires 72, 98, contact 96, wires 99, contact 101, wire 102, solenoid R, wire 75 to line wire $b$. Solenoid R therefore operates its circuit closer and starts the motor 40 in reverse direction for partly unscrewing the screw plugs from the molded caps.

When the screw plugs reach an intermediate position (Fig. 6) the contact block 60 (Fig. 8) opens the limit switch L6. This opens the circuit through the relay R1 which being de-energized, opens the contacts 96 and 97. The contact 96 being in the control circuit for the motor 40, the motor is stopped. The opening of the contact 97 breaks the circuit through the relay R6, which is therefore deenergized and allows its contact 92 to be closed. This completes the circuit for the "platen reverse" solenoid 90 so that the platen is again started in its backward or reverse direction. The molding plugs 34 with the molded articles attached thereto, are thus withdrawn from the molds 20 as before described.

Before the platen completes its backward movement, it closes the limit switch L7 (Figs. 2 and 10). This completes a control circuit through the control solenoid R of the motor 40 for again starting the motor in a backward direction. Such circuit may be traced from main $a$ through wire 72, limit switches L8, L7, wire 99, contact 101, solenoid R, wire 75 to main $b$. This reverse operation of the motor completes the unscrewing of the mold plugs from the molded articles. The contact block 60 then operates to open the limit switch L8 (Fig. 8) thereby opening the control circuit for the motor 40 and stopping the latter. The platen is also stopped when it completes its mold opening movement, thereby completing a cycle.

Modifications may be resorted to within the spirit and scope of the appended claims.

I claim:

1. An injection molding machine comprising a carriage, a train of gears mounted thereon including a multiplicity of annular gears, molding plugs individual to said annular gears and each extending through its said gear and having a driving connection therewith for causing the plug to rotate with the gear and permitting a straight lengthwise movement of the plug within its said gear while the gear is held stationary, said plugs being formed with spiral molding surfaces, dies cooperating with the plugs for molding articles, means for moving the plugs lengthwise into molding position, means for holding the gears from rotating during said lengthwise movement of the plugs, and means for driving said gear train and thereby simultaneously rotating the molding plugs and causing them to be guided spirally by the molded articles to a retracted position and to be separated from the said articles.

2. The combination of a carriage, a molding plug mounted therein for rotation about an axis and for movement lengthwise of said axis, said plug being formed with a helical molding surface, means for moving said plug lengthwise to a molding position including a stop block mounted in the carriage, and means for moving said block into position behind the molding plug to hold it in said molding position.

3. The combination of a carriage, a molding plug mounted therein for rotation about an axis and for movement lengthwise of said axis, said plug being formed with a helical molding surface, means for moving said plug lengthwise to a molding position including a wedge block slidably mounted in the carriage, and means for moving said block in a direction transverse to said axis and sliding it into a position behind the molding plug while the latter is in molding position and thereby forming a stop abutment by which the plug is held in said position.

4. An injection molding machine comprising a stationary die plate, a carriage, molds each comprising a hollow mold section mounted in the die plate and a molding plug mounted in the carriage, said plugs being formed with helical molding surfaces, means for moving the carriage toward and from the stationary die plate and thereby moving the molding plugs into and out of molding position in which they project into the hollow mold sections, said plugs being mounted for rotative and lengthwise movement within the carriage, wedge blocks individual to said plugs and mounted in the carriage for movement transversely of the plugs into and out of position to form stops for the plugs while the latter are in said molding position, a motor, and operating connections between the motor and said blocks.

5. An injection molding machine comprising oppositely disposed vertical plates including a stationary die plate and a movable plate, a carriage on which the movable plate is mounted, means for reciprocating the carriage toward and from the die plate, molds each comprising a hollow mold section mounted in the die plate, and a molding plug mounted in the carriage for lengthwise and rotative movement therein, stop blocks individual to the plugs and mounted in the carriage for movement in a direction transverse to the movement of the carriage for moving said blocks into and out of stop positions in which they form abutment stops for said plugs, a piston motor, and means providing operating connections between the motor and stop blocks.

6. An injection molding machine comprising a stationary support, a carriage, molds each comprising a hollow mold section having a stationary mounting in said support and a molding plug mounted for rotation and lengthwise movement in the carriage, means for reciprocating the carriage in the direction of said lengthwise movement and thereby periodically projecting the plugs into molding position, stop blocks individual to the plugs and mounted on the carriage for reciprocating movement into and out of an operative position in which they form abutments for the molding plugs and thereby hold them in molding position, a motor, and means providing driving connections between the motor and said blocks for moving the latter into and out of said operative position.

7. An injection molding machine comprising a stationary support, a carriage, molds each comprising a hollow mold section having a stationary mounting in said support and a molding plug mounted for rotation and lengthwise movement in the carriage, means for reciprocating the carriage in the direction of said lengthwise movement and thereby periodically projecting the plugs into molding position, stop blocks individual to the plugs and mounted on the carriage for reciprocating movement into and out of an operative position in which they form abutments for the molding plugs and thereby hold them in molding position, a motor, means providing driving connections between the motor and said blocks for moving the latter into and out of said operative position, and electro-responsive means actuated by the movement of the carriage for controlling the operations of said motor.

8. A molding machine comprising a carriage, a molding plug mounted therein and formed with a spiral molding surface, a cooperating mold section formed with a mold cavity into which the said plug projects, said plug being mounted for rotation about an axis and for lengthwise movement in the carriage in the direction of said axis, means for introducing molding material into the mold, an electric motor, gearing forming driving connections between the motor and said plug for rotating the latter, means for moving the plug lengthwise relative to said mold section for withdrawing the molded article from said mold section, means for guiding the plug in a straight line and holding it against rotation during said lengthwise movement, electro-responsive means controlling the operation of said motor and operative automatically to start the motor and cause a spiral rotation of the plug in the carriage and to stop the motor and rotation of the plug when the latter has been partially withdrawn from the molded article, and for again starting the motor and completely withdrawing the plug after the molded article has been withdrawn from the hollow mold section, and automatic means for controlling and synchronizing the said movements of the motor and molding plug.

9. An injection molding machine comprising molds, each including a hollow mold section and a molding plug formed with a spiral molding surface, a stationary support in which said hollow sections are mounted, a carriage in which the molding plugs are mounted for lengthwise movement, means for moving the carriage toward and from said support, means for moving the molding plugs relative to the carriage lengthwise into a molding position in which they protrude beyond the carriage into the hollow mold sections, means for injecting molding material into the molds, automatic carriage withdrawing means for withdrawing the carriage a short distance and thereby cracking the molds, automatic plug rotating means for then causing a combined rotation and lengthwise movement of the molding plugs relative to the carriage and thereby partially withdrawing them from the molded articles while the latter are within the hollow mold sections and then stopping the plugs, said carriage withdrawing means being operable to then withdraw the carriage and cause the molded articles to be withdrawn from the hollow mold sections, said plug rotating means being operable thereafter to again rotate the molding plugs and completely separate them from the molded articles, and automatic timing and controlling mechanism for initiating, controlling and synchronizing said movements of the carriage and molding plugs.

10. A molding machine comprising the combination of cooperating dies, supporting members in which the dies are mounted, one of said dies being formed with a spiral molding surface, and being mounted and guided in its support for straight-line, non-rotative movement relative to its support toward and from the other die, means for relatively moving said supports toward and from each other, and means for spirally rotating said movable die in its support and thereby withdrawing it by a spiral movement from an article molded by said dies.

11. An injection molding machine comprising oppositely disposed die plates, means for relatively moving said plates to and from each other, a hollow die open at one end and mounted in one plate with its open end substantially flush with the face of said plate, a molding plug mounted for rotation and lengthwise movement within and relative to the other die plate, means for moving said plug lengthwise into position to project within the hollow die when the die plates are together, said projecting portion of the plug being formed with a spiral molding surface, means for injecting a molding material into said hollow die, plug rotating means for rotating said plug and withdrawing it lengthwise within and relative to its die plate a predetermined extent while the die plates remain together and thereby partially unthreading it from the molded article, means for then separating the die plates and leaving the molded article supported on said plug, said plug rotating means being operable to then rotate the plug and withdraw it from the molded article, and mechanism for controlling and synchronizing said movements of the die plates and molding plug.

12. A molding machine comprising a pair of die plates relatively movable toward and from each other and having meeting faces, a molding plug mounted in one of said plates and formed with a spiral molding surface, a cooperating molding section mounted in the other die plate and formed with a mold cavity into which said plug projects when said plates are brought together, said plug being mounted for rotation about its axis and for lengthwise movement within the die plate in which it is mounted, and in the direction of said axis, means for introducing molding material into the mold, plug rotating means for rotating the plug while said die plates are held together and thereby causing the plug to be withdrawn lengthwise within its die plate by the reaction of the spiral surface of the molded article, means for separating said plates by relative movement in the direction of said axis and thereby withdrawing the molded article with the plug from the said mold section, means for holding the plug against rotation during said withdrawing of the molded article, said plug rotating means being operable to rotate the plug after the molded article has been withdrawn for disengaging it from the plug, and control means for effecting said operations of the plug rotating means.

13. An injection molding machine comprising a stationary die plate, a carriage movable toward and from said die plate, a die plate mounted on the carriage and movable therewith to bring the die plates together, molds each comprising a hollow mold section mounted in said stationary die plate and formed with a mold cavity extending inwardly from the face of the die plate and a molding plug mounted in the carriage and said movable die plate and formed with a spiral molding surface, means for moving the molding plugs lengthwise relative to said movable die plate into projected positions in which said spiral surfaces are projected beyond the movable die plate and into the mold cavities, means for injecting molding material into the molds while the die plates are together, means providing a sprue channel connecting the mold cavities and thereby causing the formation of a sprue by which the molded articles are united, plug rotating means for rotating the molding plugs while the die plates are together and thereby partially withdrawing the plugs from the molded articles, means for then withdrawing the carriage and thereby causing the plugs to withdraw the molded articles from the hollow mold sections and support them in the open, said plug rotating means being operable to rotate the molding plugs simultaneously and thereby separate them from the molded articles while the latter are in the open and held against rotation by said sprue, and control means for effecting and controlling said operations of the plug rotating means.

14. An injection molding machine comprising a stationary die plate, a carriage movable toward and from the die plate, molds each comprising a hollow mold section mounted in said die plate and formed with a mold cavity extending inwardly from the face of the die plate and a molding plug mounted in the carriage and formed with a spiral molding surface, said plugs having their axes extending in the direction of movement of the carriage, means for moving the molding plugs lengthwise relative to the carriage into projected positions in which said spiral surfaces are projected beyond the carriage and into the mold cavities, means for injecting molding material into the molds, means providing a sprue channel connecting the mold cavities and thereby causing the formation of a sprue by which the molded articles are united, means for moving the carriage away from the stationary die plate while the plugs are connected to the molded articles and thereby causing said articles to be drawn by said plugs out of the hollow mold sections, a train of gearing interconnecting the molding plugs and operative to rotate them simultaneously, and automatic means for driving said gearing after the molded articles have been withdrawn from the hollow molds and thereby separating the molded articles from said plugs.

PARKER C. TRACY.